United States Patent
Yanagawa et al.

(10) Patent No.: US 6,891,784 B2
(45) Date of Patent: May 10, 2005

(54) APPARATUS AND METHOD FOR RE-EXECUTING PRE-PIT DETECTION IF PRE-PITS ARE NOT DETECTED AFTER CHANGING REFERENCE LEVEL

(75) Inventors: Naoharu Yanagawa, Tokorozawa (JP); Junji Tanaka, Tokorozawa (JP); Shin Akabane, Tokorozawa (JP); Takakazu Sugiyama, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 471 days.

(21) Appl. No.: 10/201,271

(22) Filed: Jul. 24, 2002

(65) Prior Publication Data

US 2003/0072230 A1 Apr. 17, 2003

(30) Foreign Application Priority Data

Jul. 24, 2001 (JP) ........................... 2001-223556

(51) Int. Cl.[7] ................................. G11B 7/00
(52) U.S. Cl. .................. 369/47.22; 369/47.31; 369/53.44
(58) Field of Search ................ 369/47.22, 47.31, 369/53.44

(56) References Cited

U.S. PATENT DOCUMENTS

| | | |
|---|---|---|
| 5,757,747 A | 5/1998 | Shimada |
| 6,081,485 A | 6/2000 | Minase et al. |
| 6,215,742 B1 | 4/2001 | Kuroda et al. |
| 6,687,206 B1 * | 2/2004 | Masui ................ 369/47.19 |
| RE38,595 E * | 9/2004 | Kuroda et al. ......... 369/47.32 |

FOREIGN PATENT DOCUMENTS

| | | | |
|---|---|---|---|
| EP | 800165 A1 * | 10/1997 | ........... G11B/7/007 |
| EP | 0 871 169 | 10/1998 | |

* cited by examiner

Primary Examiner—Gautam R. Patel
(74) Attorney, Agent, or Firm—Nixon & Vanderhye, PC

(57) ABSTRACT

An information recording/reproducing apparatus irradiates a light beam on an optical disc on which pre-pits are formed, and performs recording and/or reproduction of information with respect to the optical disc according to a recording clock produced based on a wobble signal and a pre-pit signal. When recording information onto the optical disc having the pre-pits, a light beam is radiated to thereby extract the wobble signal and pre-pit signal. Then, according to the wobble signal and the pre-pit signal, a recording clock signal is produced, and information is recorded based on the recording clock signal. When producing a pre-pit signal, a push-pull signal is produced from the reflected light from the optical disc, and this signal is compared with a reference level to thereby detect a pre-pit. Here, when a pre-pit is not detected, the reference level is changed and the detection processing of the pre-pits is executed again.

12 Claims, 8 Drawing Sheets

APPARATUS AND METHOD FOR RE-EXECUTING PRE-PIT DETECTION IF PRE-PITS ARE NOT DETECTED AFTER CHANGING REFERENCE LEVEL

BACKGROUND OF THE INVENTION

1. Field of Invention

The present invention belongs to a technical field of an information recording/reproducing apparatus by which information is recorded on a recordable optical disc and is reproduced therefrom. More particularly, the invention relates to a technique for stably detecting pre-pits provided on the optical disc.

2. Description of Related Art

As an information recording medium on which information is additionally writable or rewritable, there is known a disc such as a CD-R (Compact Disc-Recordable), a DVD-R (DVD-Recordable), a DVD-RW (DVD-Rewritable), etc.

In order to record information on its non-recorded area, the above disc is formed with groove tracks (recording tracks) that are slightly wobbled in the radial direction of the disc. The groove track is formed on the disc in correspondence with a wobble signal obtained by frequency-modulating a carrier wave of a prescribed frequency by pre-information indicating the position information and the like of the track on the disc.

In order to extract the wobble signal from the groove track, a reflected light of the radiated light beam reflected from the groove track is received by a photo-detector that is divided into two parts by a dividing line that is optically parallel with a direction tangential to the groove track. Then, a difference signal between the outputs from the respective detectors is generated, and that difference signal is supplied to a BPF (Band Pass Filter), the central frequency of which is the above-mentioned prescribed frequency.

The above-described disc is rotated so that the average frequency of the wobble signal extracted by the BPF is equal to the above-described prescribed frequency. At this time, the wobble signal thus extracted (hereinafter called "the extracted wobble signal" as well) is also used as a reference signal to produce a clock signal for recording (hereinafter referred to as "recording clock signal"). Namely, the extracted wobble signal is a continuous signal having a frequency component synchronized with the rotation of the disc. By producing a clock signal synchronized, in phase, with such continuous signal, the recording signal exactly synchronized with the rotation of the disc is generated.

Also, in addition to the fact that the groove tracks are wobbled, so-called "pre-pits" are formed on each of land tracks adjacent to the groove tracks at prescribed intervals. The pre-pits are also used for adjusting the phase of the recording clock signal that has been produced from the extracted wobble signal. Since the pre-pits are formed, in advance, on the information recording area of the disc at prescribed intervals, the information recording/reproducing apparatus produces the recording clock signal according to the extracted wobble signal and also adjusts the phase of the recording clock signal based on the detected result of the pre-pits. Thus, the information recording/reproducing apparatus produces a correct recording clock signal for recording information onto the disc and performs recording of information according to the correct recording clock signal.

In one or some of the above-described discs, the groove track for recording information is discontinuously (intermittently) formed in the lead-in area where information relating to the copyright and/or information for preventing the unauthorized copy are recorded. Namely, the groove track is continuously formed in the data area for recording information. On the contrary, as a result of the groove track being discontinuously formed, that area has such a configuration that concavities and convexities are repeatedly formed on the surface of the disc (hereinafter such portion is also called "the emboss area").

In the non-recorded disc such as a DVD-RW or else, there is beforehand recorded important information such as information for preventing the above-described unauthorized copy in the emboss area within the lead-in area, and that information is of course readable. However, within the emboss area, even when recording information with an aim to rewrite that important information illegally, since the recording groove track is formed intermittently, the over-written information cannot correctly be reproduced. Therefore, it is possible to prevent important information associated with unauthorized copy and so on from being illegally rewritten.

However, there is such a problem that, since the groove track is intermittently formed within the emboss area, the noise components of the extracted wobble signal including the pre-pit signals increase, and it becomes difficult to stably perform the detection of the pre-pit signals. For this reason, in the so-called "finalizing processing" executed at the time of ending recording of information onto the disc, the recording clock signal becomes unstable and the finalizing processing cannot be executed correctly.

SUMMARY OF THE INVENTION

The present invention has been made in view of the above-described problem, and has an object to provide an information recording/reproducing apparatus and pre-pit detecting method that can stably detect pre-pits to perform correct information recording even in the area, such as the emboss area, wherein the groove track is not continuously formed.

According to one aspect of the present invention, there is provided an information recording/reproducing apparatus which irradiates a light beam on an optical disc on which pre-pits are formed, and performs recording and/or reproduction of information with respect to the optical disc according to a recording clock produced based on a wobble signal and a pre-pit signal, including: a push-pull signal producing unit which produces a push-pull signal based on a reflected light from the optical disc; a pre-pit detecting circuit which detects the pre-pits by comparing the push-pull signal and a reference level; and a control unit which executes retry process of changing the reference level and again executing the detection of the pre-pits by the pre-pit detecting circuit, when the pre-pit is not detected.

In accordance with the information recording/reproducing apparatus, when recording information onto the optical disc having the pre-pits, a light beam is radiated to thereby extract the wobble signal and pre-pit signal. Then, according to the wobble signal and the pre-pit signal, a recording clock signal is produced, and information is recorded based on the recording clock signal. When producing a pre-pit signal, a push-pull signal is produced from the reflected light from the optical disc, and this signal is compared with a reference level to thereby detect a pre-pit. Here, when a pre-pit is not detected, the reference level is changed and the detection processing of the pre-pits is executed again.

The control unit may execute the retry process only in emboss areas of the disc in which information recording tracks are intermittently formed. By this, the pre-pit is correctly detected even in an area wherein a relatively large amount of noise is contained in each of the wobble signal and pre-pit signal because the information recording track is intermittently formed.

In an embodiment, the emboss areas may include an unreadable emboss area of the optical disc.

The control unit may execute the retry process from a foremost portion of the emboss area when the pre-pit is not detected. Thus, it is possible to reliably execute the detection of the pre-pits again from the foremost position of the emboss area with changing the reference level.

The control unit may execute the retry process for every unit including a prescribed number of blocks within the emboss area when the pre-pit is not detected. Thus, it is possible to quickly execute the retry processing without returning the position of the light beam.

The control unit may repeatedly execute the retry process with increasing or decreasing the reference level by a prescribed change amount. In this embodiment, since the retry processing is executed while the reference value level is being changed to increase and decrease, it is possible to effectively execute the retry processing regardless of the characteristics of the noise components.

The prescribed change amount may be determined to be a value which has a prescribed proportion to the amplitude of the wobble signal. Therefore, it is possible to determine an appropriate change amount of the reference level in consideration of the amplitude of the wobble signal.

The control unit may execute an irregular process of writing data into an area immediately succeeding the unreadable emboss area according to the recording clock produced from only the wobble signal, when the pre-pit detecting circuit cannot detect the pre-pit after executing the retry process.

By this, if the pre-pit is not detected after the retry process, recording of information is performed according to only the wobble signal. Therefore, when the accuracy of the wobble signal is high, it is possible to complete the recording for the disc, and it is possible to avoid wasting the disc by stopping the recording.

The control unit may execute the irregular process, when the pre-pit detecting circuit cannot detect the pre-pit after executing the retry process for a prescribed number of times or after executing the retry process with changing the reference level within a prescribed range. By this, the irregular processing is executed only in an exceptional case where the pre-pits cannot be detected after executing the retry processing for several times.

According to another aspect of the present invention, there is provided a pre-pit detecting method performed by an information recording/reproducing apparatus which irradiates a light beam on an optical disc on which pre-pits are formed, and performs recording and/or reproduction of information with respect to the optical disc according to a recording clock produced based on a wobble signal and a pre-pit signal, the method including the steps of: producing a push-pull signal based on a reflected light from the optical disc; detecting the pre-pits by comparing the push-pull signal and a reference level; and executing retry process of changing the reference level and again executing the detection of the pre-pits, when the pre-pit is not detected.

In accordance with the pre-pit detecting method, a push-pull signal is produced from the reflected light from the optical disc and this signal is compared with the reference level to thereby detect the pre-pits. Here, when the pre-pit is not detected, the detection processing of the pre-pit is executed again with changing the reference level.

The step of executing the retry process may repeatedly execute the retry process with increasing or decreasing the reference level by a prescribed change amount. By this, since the retry processing is executed while the reference value level is being changed to increase and decrease, it is possible to effectively execute the retry processing regardless of the characteristics of the noise components.

The pre-pit detecting method may further include a step of executing an irregular process of writing data into an area immediately succeeding the unreadable emboss area according to the recording clock produced from only the wobble signal, when the pre-pit is not detected after executing the retry process. Therefore, when the accuracy of the wobble signal is high, it is possible to complete the recording for the disc, and it is possible to avoid wasting the disc by stopping the recording.

The nature, utility, and further features of this invention will be more clearly apparent from the following detailed description with respect to preferred embodiment of the invention when read in conjunction with the accompanying drawings briefly described below.

DESCRIPTION OF THE PREFERRED EMBODIMENTS

Figure 1:
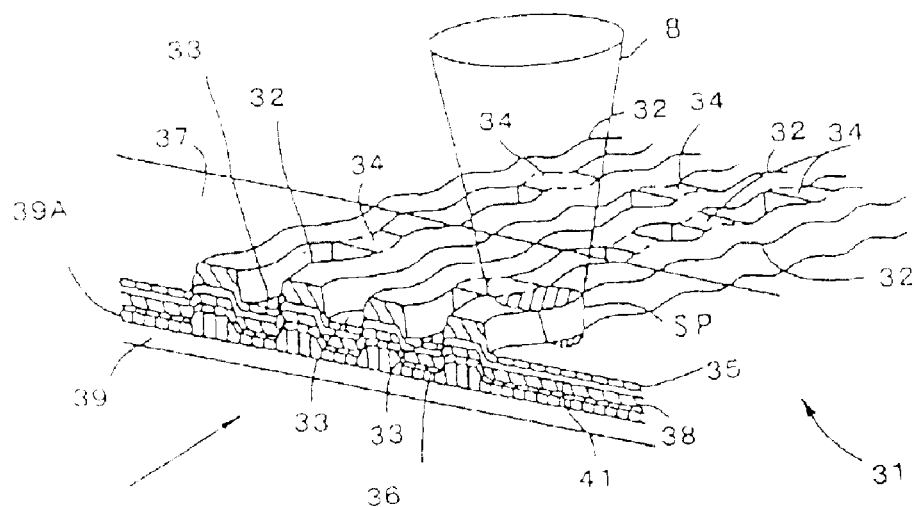
FIG. 1 is a view illustrating a structure of grooves and pre-pits of a DVD-RW.

Hereinafter, a preferred embodiment of the present invention will be explained with reference to the appended drawings.

[1] Configuration of the Optical Disc

First, an explanation will be given, using FIGS. 1 and 2, of a DVD-RW serving as an optical disc on which pre-pits corresponding to the pre-information are formed and groove tracks as later described are wobbled at a prescribed frequency.

First of all, a structure of a DVD-RW will be explained with reference to FIG. 1. In FIG. 1, the DVD-RW 31 is a rewritable pigment type disc having a recording layer 41 serving as a data recording layer. The DVD-RW 31 has groove tracks 32 serving as a data recording track, and land tracks 33 serving as a guiding track for guiding, to the groove track 32, a light beam such as a laser beam which serves as a reproduction light or a recording light. The land track 33 is formed with pre-pits 34 corresponding to the pre-information. These pre-pits 34 are previously formed before shipping the DVD-RW 31.

The groove tracks 32 and the land tracks 33 are formed on a protection film 37, and, on the lower part of the protection film 37 of FIG. 1, a recording layer 41 is formed in a fashion being sandwiched between a protection layer 35 and a protection layer 38. Also, on the lower side in FIG. 1 of the protection layer 38, a reflection layer 36, a resin layer 39A and a substrate 39 are formed.

Further, in the DVD-RW 31, the groove track 32 is wobbled at a frequency corresponding to the rotation speed of the disc. This wobbled groove track 32 is formed in advance of shipping the DVD-RW 31, similarly to the pre-pits 34.

When recording the recording information (this information means information such as video information other than the pre-information that is to be originally recorded. Hereinafter the same applies.) onto the DVD-RW 31, by extracting the wobbling frequency of the groove track 32 by the information recording/reproducing apparatus as later described, the rotation of the DVD-RW 31 is controlled to keep a prescribed rotation speed. In addition, by detecting the pre-pits 34 to obtain the pre-information, an optimum output power of a light beam B serving as the recording light is set according to the pre-information. Further, address information indicating the position on the DVD-RW 31 at which recording information is to be recorded is obtained, and the recording information is recorded at the corresponding recording position based on the address information.

When performing recording of recording information, the light beam B is irradiated so that the center of the light beam B coincides with the center of the groove track 32. By this, information pits corresponding to the recording information are formed on the groove track 32 to thereby record the recording information. At this time, the size of the light spot SP is set such that a part of the light spot SP is irradiated not only the onto the groove track 32 but also onto the land track 33, as illustrated in FIG. 1.

From a part of the reflected light from the light spot SP of the light irradiated onto the land track 33, the preinformation is detected from the pre-pits 34 by a push-pull method (the push-pull method based on the use of a photodetector that is divided by a dividing line parallel with a direction tangential to the groove track 32, i.e. the rotation direction of the DVD-RW 31 (hereinafter referred to as "the radial push-pull method")). Simultaneously, a wobble signal is extracted from the groove track 32 to generate a recording clock signal that is synchronized with the rotation of the disc, as described later.

It is noted that, for convenience of the explanation, FIG. 1 illustrates the disc in a state being turned upside down, compared to a state when recording/reproduction are performed on the disc. Normally, the light beam B is irradiated onto the lower surface of the disc from below, whereby recording data is recorded and/or reproduced on and/or from the disc.

Also, the protection film 37 in FIG. 1 serves as a base for the DVD-RW 31 on which the groove tracks 32 and land tracks 33 are formed. On the protection film 37, there are further formed the protection layer 35, the recording layer 41, the protection layer 38, the reflection layer 36, the resin layer 39A, and the substrate 39. Thus, the DVD-RW 31 is manufactured. It is noted that, regarding the names of the groove track 32 and land track 33, when the structure of FIG. 1 is viewed from the side of the protection film 37 serving as the base, the concave portion is called as the groove track 32 and the convex portion is called as the land track 33, because the DVD-RW 31 is shown in FIG. 1 in the upside-down manner.

Next, the recording format of the pre-information that is recorded on the DVD-RW 31, in advance, will be explained by referring to FIG. 2. It is to be noted that, in FIG. 2, the upper part represents the recording format of the recording information, and the waveforms at the lower part represent a state of wobbling of the groove track 32 on which the recording information is recorded. The upwardly pointed arrows $B_0$ to $B_2$ between the recording information and the wobbled state of the groove track 32 schematically illustrate the positions at which the pre-pits 34 are formed. Here, in FIG. 2, for easier understanding, the wobbled state of the groove track 32 is illustrated with an amplitude greater than the actual amplitude. It is also to be noted that the recording information is recorded on the center line of the groove track 32.

Figure 2:
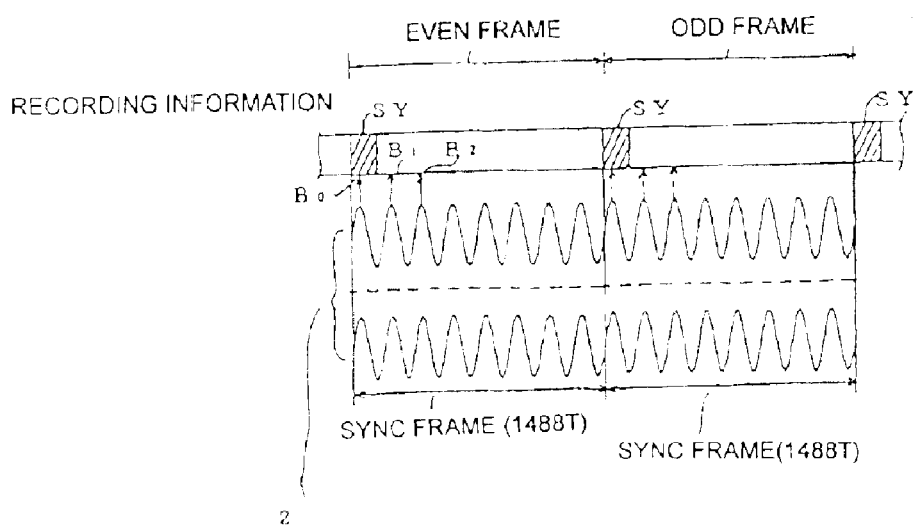
FIG. 2 is a diagram illustrating a format of the grooves and pre-pits of the DVD-RW.

As illustrated in FIG. 2, the recording information to be recorded on the DVD-RW 31 is divided into a synch frame serving as information unit, beforehand. And, one recording sector is formed by 26 synch frames, and one ECC (Error Correcting Code) block is formed by 16 recording sectors. One synch frame has a length 1488 times (1488T's) as large as the unit length (hereinafter called "T") corresponding to the pit interval defined by the recording format used at the time of recording the above-described recording information. Further, the leading portion of the synch frame having a length corresponding to 14T is used as synchronizing information SY for the synchronization by the unit of synch frame.

On the other hand, the pre-information recorded on the DVD-RW 31 is recorded by the units of a synch frame. Here, in a case where the pre-information is recorded on the DVD-RW 31 as the pre-pit 34, one pre-pit 34 is necessarily formed, as a synchronizing signal for the pre-information, on the land track 33 adjacent to that region in each synch frame of the recording information where the synchronizing information SY is recorded. In addition, two or one pre-pit 34 is formed, in order to indicate the contents of the pre-information to be recorded, on the land track 33 adjacent to the beginning half portion within each synch frame excluding the synchronizing information SY. It is to be noted that, regarding the beginning half portion within the synch frame excluding the synchronizing information SY, there is a case where no pre-pits 34 are formed, depending upon the contents of the pre-information to be recorded.

At this time, in one recording sector, the pre-pits 32 are formed only in the even-numbered synch frames (hereinafter referred to as "the EVEN frames") and the pre-information is recorded. Namely, in FIG. 2, in a case where the pre-pits 34 are formed in the EVEN frames (this is indicated in FIG. 2 by the solid upwardly pointed arrows), the pre-pits 34 are not formed in the ODD frames adjacent to them. The relationship concerning whether or not the pre-pits 34 (the pre-pits are indicated as $B_0$, $B_1$, and $B_2$ from the foremost position of the synch frame) are present in one EVEN frame and one succeeding ODD frame is determined according to whether or not that EVEN frame is at the head of the recording sector and according to the contents of the information to be recorded in the EVEN frame and the succeeding ODD frame.

More specifically, in a case of forming the pre-pits in the EVEN frame, in the synch frame located at the foremost position of the recording sector, all the pre-pits 34 (the pre-pits $B_0$, $B_1$, and $B_2$) are formed. In each of synch frames other than that located at the foremost position of the recording sector, if the information to be recorded in that synch frame is "1", only the pre-pits $B_0$ and $B_2$ are formed, and when the information to be recorded is "0", the pre-pits $B_0$ and $B_1$, are formed. Also, in a case of forming the pre-pits in the ODD frame, in the synch frame located at the foremost position of the recording sector, the pre-pits $B_0$ and $B_1$ are formed, and in each of synch frames other than that located at the foremost position of the recording sector, the same as in the case of the EVEN frame applies.

Whether the pre-pits 34 are formed in the EVEN frame or ODD frame is determined depending upon the position of the preceding pre-pit 34 formed on the adjacent land track. Namely, basically, the pre-pits 34 are normally formed in the EVEN frame. However, the pre-pit 34 formed in the EVEN frame is close to the preceding pre-pit 34 on the adjacent land track in the radial direction of the DVD-RW 31 disc, the pre-pit 34 is formed not in the EVEN frame but in the ODD frame. By forming the pre-pit 34 in this manner, no pre-pit 34 are formed on the adjacent land track, and it is therefore possible to decrease the adverse effect of the cross-talks when detecting the pre-pit 34.

On the other hand, the groove track 32 is wobbled, over all synch frames, at a fixed wobbling frequency f0 of 140 KHz (the frequency in which a wobble signal of 8 waves falls within one synch frame). By extracting the fixed wobbling frequency f0 by the information recording/reproducing apparatus, the signal for the rotation control of the spindle motor is detected, and the recording clock signal is produced.

It is noted that, in order to appropriately maintain the phase relationship between the pre-pit 34 and the wobble signal, the pre-pit $B_0$ is formed at a prescribed position as measured from the starting position of the synch frame (for example, the position spaced by a distance corresponding to 7T from that position), and the pre-pits $B_1$, and $B_2$ are sequentially spaced away from the pre-pit $B_0$ by a distance corresponding to 186 T (1488T/8) and further 186T, respectively. The pre-pit forming method has been explained in the Japanese Patent Application Laid-Open No. 8-310941 in detail.

[2] Recording Format of the Optical Disc

Figure 3A:
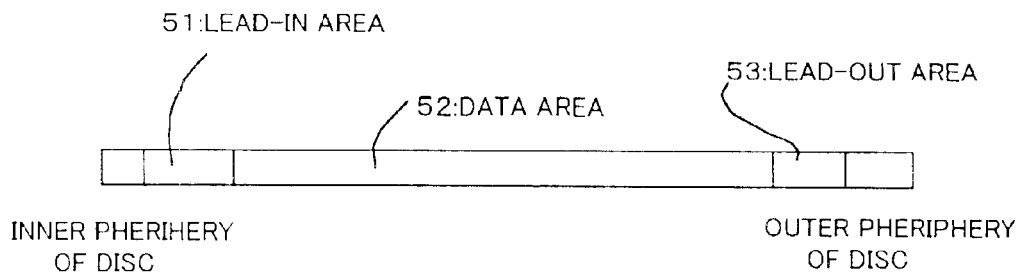
FIGS. 3A and 3B are views illustrating a recording format of the DVD-RW.

Next, the recording format of the above-described DVD-RW 31 will be explained. FIG. 3A schematically illustrates a section of the DVD-RW 31 and, from the inner-peripheral side of the disc toward the outer-peripheral side thereof, there are provided a lead-in area 51, a data area 52, and a lead-out area 53. The lead-in area 51 is an area for storing therein various kinds of control information and managing information; the data area 52 is an area for recording therein video information and other recording information; and the lead-out area 53 is an area that defines the outermost peripheral portion of the data area 52.

Figure 3B:
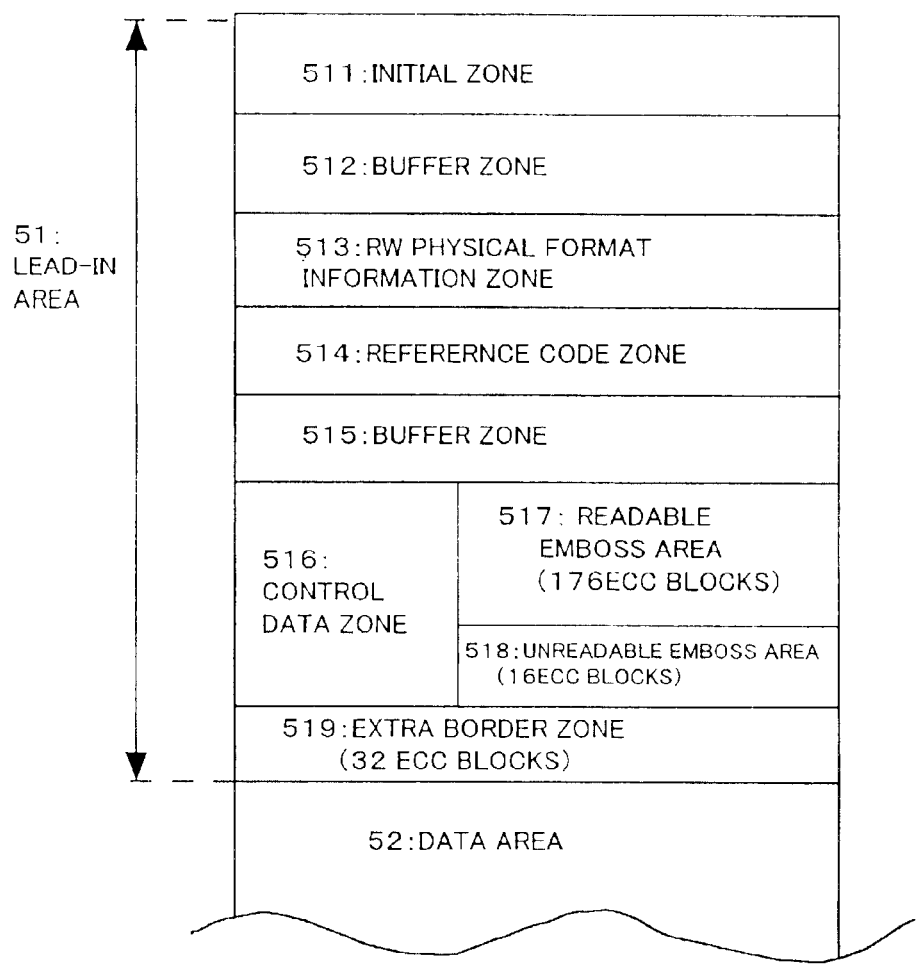

FIG. 3B illustrates a more detailed data structure of the lead-in area 51. The lead-in area 51 includes, from the inner-peripheral side of the disc, an initial zone 511, a buffer zone 512, an RW physical format information zone 513, a reference code zone 514, a buffer zone 515, a control data zone 516, and an extra border zone 519. Among these zones, the ones that are particularly relevant to the present invention are the control data zone 516 and the extra border zone 519.

The control data zone 516 includes a readable emboss area 517 on the inner-peripheral side of the disc and an unreadable emboss area 518 on the outer-peripheral side of the disc. The control data zone 516 is formed into an emboss area in which the groove track 32 for recording information is intermittently (discontinuously) formed in the peripheral direction (the tangential direction) of the disc.

Out of those zones, in the readable emboss area 517, there are recorded beforehand, at the time of shipment from the factory, for example, control data such as copyright information and information for preventing illegal copy. These control data are readable by the recording/reproducing apparatus of an optical disc. However, since the groove track 32 is intermittently formed in the readable emboss area 517, even if data is written over the control data, it cannot correctly be read out. As a result, the control data is prevented from being illegally re-written.

Within the readable emboss area 517, the pre-pits 34 are not formed on the land track 33. This is because the pre-pits 34 are originally formed for the purpose of producing a recording clock signal in the non-recorded area. Namely, since the control data previously recorded is only read out within the readable emboss area 517, the pre-pits 34 are not formed.

The unreadable emboss area 518 is provided with an aim to establish a clock synchronization for writing information into the extra border zone 519 following the unreadable emboss area 518. In case of writing information onto the DVD-RW 31, information is recorded according to the extracted wobble signal and the recording clock signal that is produced from the detection signal of the pre-pits 34. However, as explained with reference to FIG. 2, since the pre-pits 34 are discontinuously formed, unless multiple pre-pits 34 are detected by reading a certain length of area of the DVD-RW 31, the recording clock signal that has a correct phase cannot be produced.

On the other hand, in order to record information in the extra border zone 519, a correct recording clock signal must be produced at the foremost position of the extra border zone 519. For this reason, immediately before the extra border zone 519, the unreadable emboss area 518 is provided and multiple pre-pits 34 are detected in the unreadable emboss area 518 to produce a correct recording clock signal. In this way, it is designed that, when a recording light beam has reached the foremost position of the extra border zone 519, a correct recording clock signal has already been produced.

Therefore, within the unreadable emboss area 518, no information is recorded and the pre-pits 34 are simply formed according to the above-described rules. Accordingly, the information recording/reproducing apparatus produces the recording clock signal of correct phase by reading the pre-pits 34 within the unreadable emboss area 518 and, according to that recording clock signal, performs recording of information into the extra border zone 519.

[3] Information recording/reproducing apparatus

Next, an embodiment of the information recording/reproducing apparatus according to the present invention will be explained with reference to FIGS. 4 to 9. It is to be noted that, in the following embodiment, the pre-pits 34 containing address information on that DVD-RW 31 and the wobbled groove track 32 are formed on the DVD-RW 31. When recording information, the information recording/reproducing apparatus S controls the rotation of the DVD-RW 31 according to the wobble frequency of the groove track and obtains the address information on the DVD-RW 31 by detecting the pre-pits 34. Thus, the information recording/reproducing apparatus S detects the recording position on the DVD-RW 31 for recording the recording information and performs recording thereon.

Figure 4:
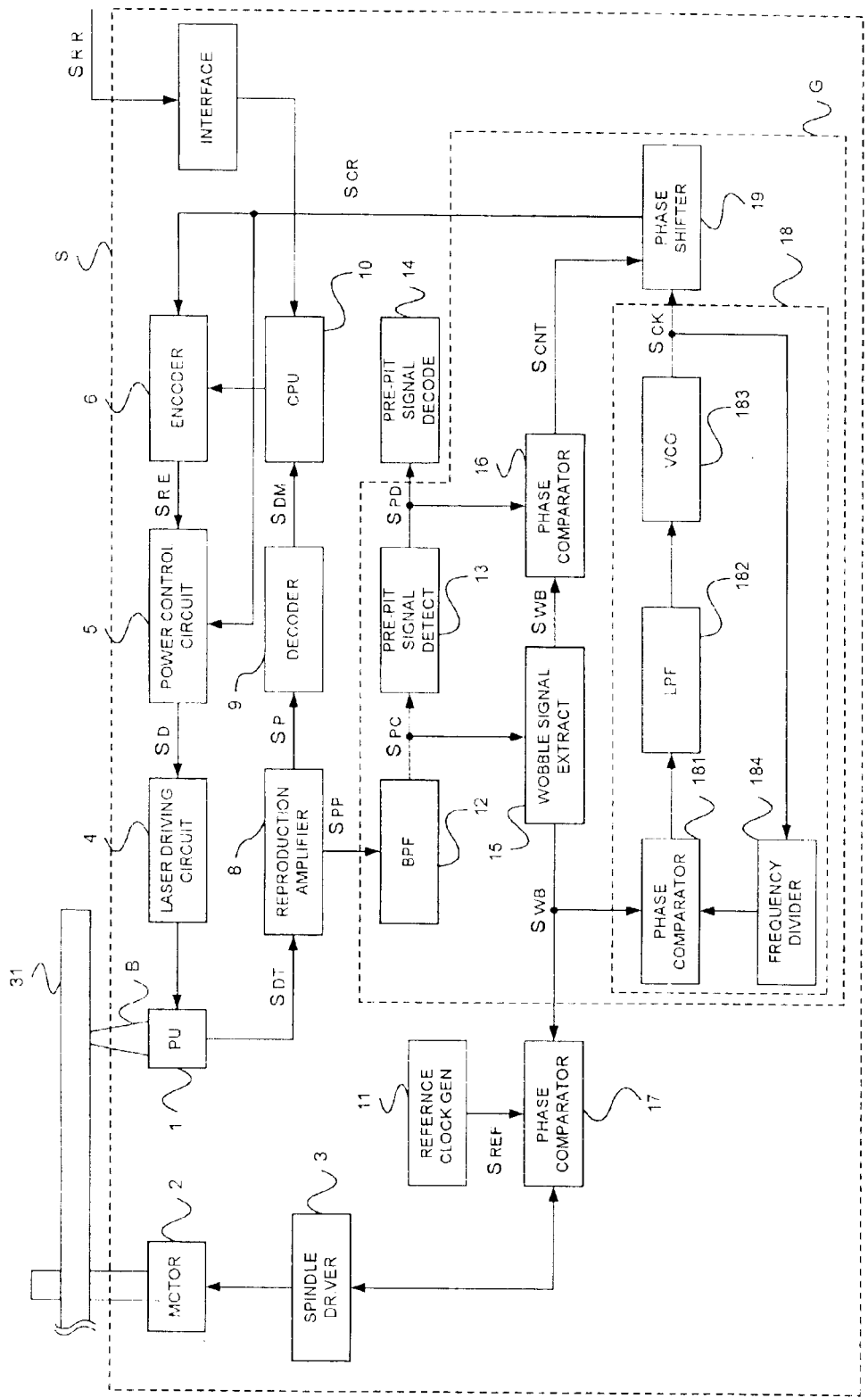
FIG. 4 is a block diagram illustrating a construction of an information recording/reproducing apparatus according to an embodiment of the present invention.

As illustrated in FIG. 4, the information recording/reproducing apparatus S includes a pick-up 1, a spindle motor 2, a spindle driver 3, a laser driving circuit 4, a power control circuit 5, an encoder 6, an interface 7, a reproduction amplifier 8, a decoder 9, a processor (CPU) 10, a reference clock generator 11 for producing a reference clock signal for the control of the rotation, a BPF (Band Pass Filter) 12, a pre-pit signal detector 13, a pre-pit signal decoder 14, a wobble signal extractor 15, a phase comparator 16, a phase comparator 17 for generating a rotation control signal, a PLL (Phase Locked Loop) circuit 18, and a phase shifter 19. The PLL circuit 18 includes a phase comparator 181, a LPF (Low Pass Filter) 182, a VCO (Voltage Controlled Oscillator) 183, and a frequency divider 184.

In the information recording/reproducing apparatus S, from a host computer located outside (not illustrated), information to be recorded is input thereto via the interface 7 and the information recorded on the DVD-RW 31 is output therefrom via the interface 7.

Next, the over-all operation will be explained. The pick-up 1 includes a laser diode, a polarized beam splitter, an objective lens, and a photo-detector illustrated in FIG. 5. When performing its recording operation, the pick-up 1 irradiates a light beam B onto the information recording surface of the DVD-RW 31, with an emission power that changes correspondingly to the laser driving signal based on the recording information supplied from the laser driving circuit 4, and performs recording of the recording information. When performing its reproduction operation, the pick-up 1 irradiates the light beam B onto the DVD-RW 31 with a fixed emission power (read-out power) and operates to receive the reflected light by the photo-detector.

Also, the pick-up 1 receives, by the photo-detector, the reflected light of the light beam that is irradiated onto the information recording surface, and converts it into electric signals. Then the pick-up 1 executes operation processing of the electric signals based on, for example, a radial push-pull method to produce a detection signal SDT carrying the pre-pit signal of the pre-pit 34, the wobble signal of the groove track 32 and recording information, and outputs the detection signal SDT to the reproduction amplifier 8.

The reproduction amplifier 8 amplifies the detection signal SDT, carrying the pre-pit signal of the pre-pit 34 and the wobble signal of the groove track 32, output from the pick-up 1, and outputs to the BPF 12 a pre-information signal SPP containing the pre-pit signal of the pre-pit 34 and the wobble signal of the groove track 32. When performing the reproduction operation, the reproduction amplifier 8 outputs to the decoder 9 an RF signal SP corresponding to the recording information that is already recorded on the DVD-R 31.

Figure 5:
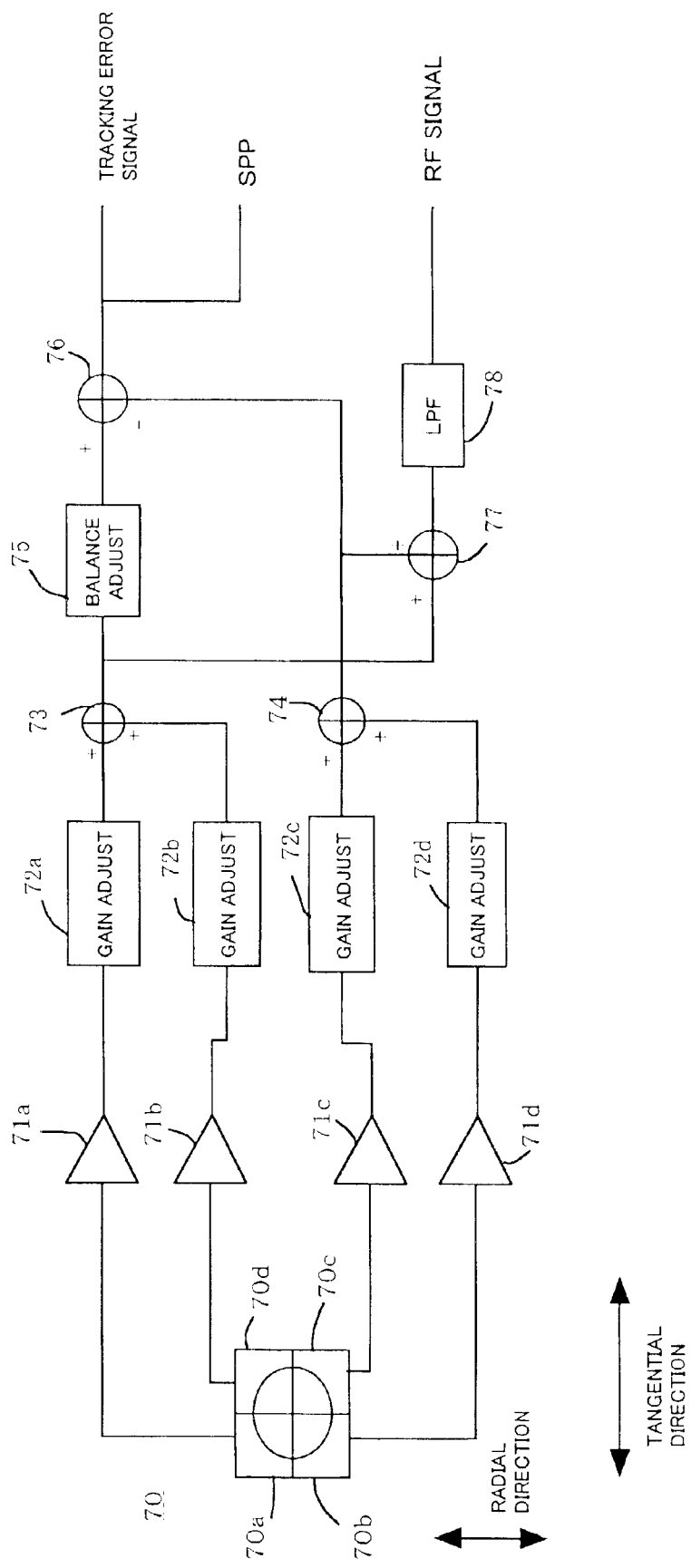
FIG. 5 is a block diagram illustrating a construction of a reproduction amplifier illustrated in FIG. 4.

An example of the reproduction amplifier 8 is illustrated in FIG. 5. In FIG. 5, the photo-detector 70 included in the pick-up 1 is a so-called "4-divided type photo-detector, which is equipped with four detecting elements 70a to 70d. Also, the reproduction amplifier 8 has amplifiers 71a to 71d, gain adjusters 72a to 72d, adders 73, 74, 76, and 77, a balance adjuster 75, and a low pass filter (LPF) 78.

The electric signals output from the respective detecting elements 70a to 70d of the photo-detector 70 are respectively amplified by the amplifiers 71a to 71d. The output signals of the amplifiers 71a to 71d are gain-adjusted by the gain adjusters 72a to 72d so that the respective gains thereof become equal to one another. Next, the output signal of the gain adjuster 72a and the output signal of the gain adjuster 72b are added by the adder 73, and the output signal of the adder 73 is input to the balance adjuster 75 and the adder 77.

On the other hand, the output signal of the gain adjuster 72c and the output signal of the gain adjuster 72d are added by the adder 74, and the output signal of the adder 74 is input to the adder 76 and to the adder 77.

The balance adjuster 75 executes a prescribed balance adjustment processing for the output signal of the adder 73 and inputs its output signal to the adder 76. By subtracting the output signal of the adder 74 from the output signal of the balance adjuster 75, the adder 76 produces the pre-information signal SPP used, for example, for the detection of the pre-pits. The pre-information signal SPP is supplied to the BPF 12 illustrated in FIG. 4. It is noted that the pre-information signal SPP is also utilized as the tracking servo signal and is input to a tracking servo control circuit not illustrated.

On the other hand, the adder 77 adds up the output signal of the adder 73 and the output signal of the adder 74, and the LPF 78 eliminates the noise component from the output signal of the adder 77 to produce an RF signal SP. The RF signal SP is a signal indicating the recording information that is recorded on the DVD-RW 31, and the RF signal SP is supplied to the decoder 9 illustrated in FIG. 4.

Turning back to FIG. 4, the decoder 9 decodes the RF signal SP by performing 8/16 demodulation and de-interleaving processing with respect to the RF signal SP that has been input thereto, and thereby produces a demodulated signal SDM and outputs the demodulated signal SDM to the CPU 10.

On the other hand, the BPF 12 eliminates the noise components contained in the pre-information signal SPP supplied from the reproduction amplifier 8 and outputs a composite signal SPC (see. FIG. 8A), in which the pre-pit signal is superposed on the wobble signal at prescribed positions (e.g. at maximum-amplitude positions), to the pre-pit signal detector 13 and to the wobble signal extractor 15.

The pre-pit signal detector 13 includes a comparator that compares the composite signal SPC with a prescribed reference value, e.g. a reference level Vrp (this reference level Vrp is called "the pre-pit detection reference level" hereinafter), the value of which is larger than the maximum amplitude value of the wobble signal in FIG. 8A. During a time period in which the amplitude level of the composite signal SPC is higher than the pre-pit detection reference level Vrp, i.e. in which the pre-pit exists, the detector 13 outputs a pre-pit detection signal SPD, which is a pulse signal, to the pre-pit signal decoder 14 and to the phase comparator 16.

The pre-pit signal decoder 14 decodes the pre-information including the address information on the DVD-RW 31 from the pre-pit detection signal SPD and outputs the pre-information to the CPU 10.

On the other hand, the wobble signal extractor 15, serving as a wobble signal extracting unit, includes a comparator that compares the composite signal SPC with a prescribed reference value, e.g. an intermediate level Vr0 of the PP (Peak-to-Peak) value of the wobble signal in FIG. 8A. The wobble signal extractor 15 outputs a pulse signal (FIG. 8B), whose level is H (high) during a time period in which the amplitude level of the composite signal SPC is higher than the reference value Vr0, to the phase comparators 16 and 17 and to the PLL circuit 18, as the extracted wobble signal SWB.

The PLL circuit 18 includes the phase comparator 181, the LPF 182, the VCO 183 and the frequency divider 184, and outputs a clock signal SCK synchronized with the phase of the extracted wobble signal SWB input thereto, to the phase shifter 19.

The phase comparator 16 performs phase comparison on the pre-pit detection signal SPD and the extracted wobble signal SWB through the operation as later described, and outputs, to the phase shifter 19, a phase adjustment signal SCNT representing a phase shift from a prescribed phase relationship that the pre-pit detection signal and the extracted wobble signal originally have with respect to each other.

The phase shifter 19 adjusts the phase of the clock signal SCK supplied from the PLL circuit 18 according to the phase adjustment signal SCNT, and outputs the resulting signal to the encoder 6 and to the power control circuit 5, as the recording clock signal SCR.

The phase comparator 17 performs phase comparison between the input extracted wobble signal SWB and a reference clock signal SREF supplied from the reference clock generator 11 and carrying the reference frequency component corresponding to the rotation speed of the DVD-RW 31, and supplies the difference signal to the spindle motor 2 via the spindle driver 3, as the rotation control signal. A spindle servo loop is thereby constructed, and the DVD-RW 31 is rotated with a prescribed number of rotations by the spindle motor 2.

The interface 7 performs the interface operation, under the control of the CPU 10, for taking into the information recording/reproducing apparatus the recording information SRR that is sent from the host computer not illustrated, and the interface 7 outputs the recording information SRR to the encoder 6 via the CPU 10.

By using the recording clock signal SCR supplied from the phase shifter 19 as a timing signal, the encoder 6 performs ECC processing, 8/16 modulation processing and scrambling processing on the recording information to produce a modulated signal SRE and outputs it to the power control circuit 5.

The power control circuit 5 operates to improve the configuration of the recording pits formed on the disc. Namely, according to the recording clock signal SCR output from the phase shifter 19, the power control circuit 5 performs wave conversion (so-called "write strategy processing") of the modulated signal SRE and outputs the resulting signal to the laser driving circuit 4 as a recording signal SD.

The laser driving circuit 4 outputs a laser driving signal for actually driving the laser diode within the pick-up 1 to emit the light beam B with an emission power corresponding to the recording signal SD supplied thereto.

At the time of performing recording operation, the CPU 10 controls the entire information recording/reproducing apparatus to obtain address information from the pre-information supplied from the pre-pit signal decoder 14, and to record the recording information at the position on the DVD-RW 31 that corresponds to the address information thus obtained. Also, the CPU 10, at the time of performing reproduction operation, controls the entire information recording/reproducing apparatus to obtain the recording information recorded on the DVD-RW 31 from the demodulated signal SDM and to output the recording information to the host computer located outside.

Figure 6:
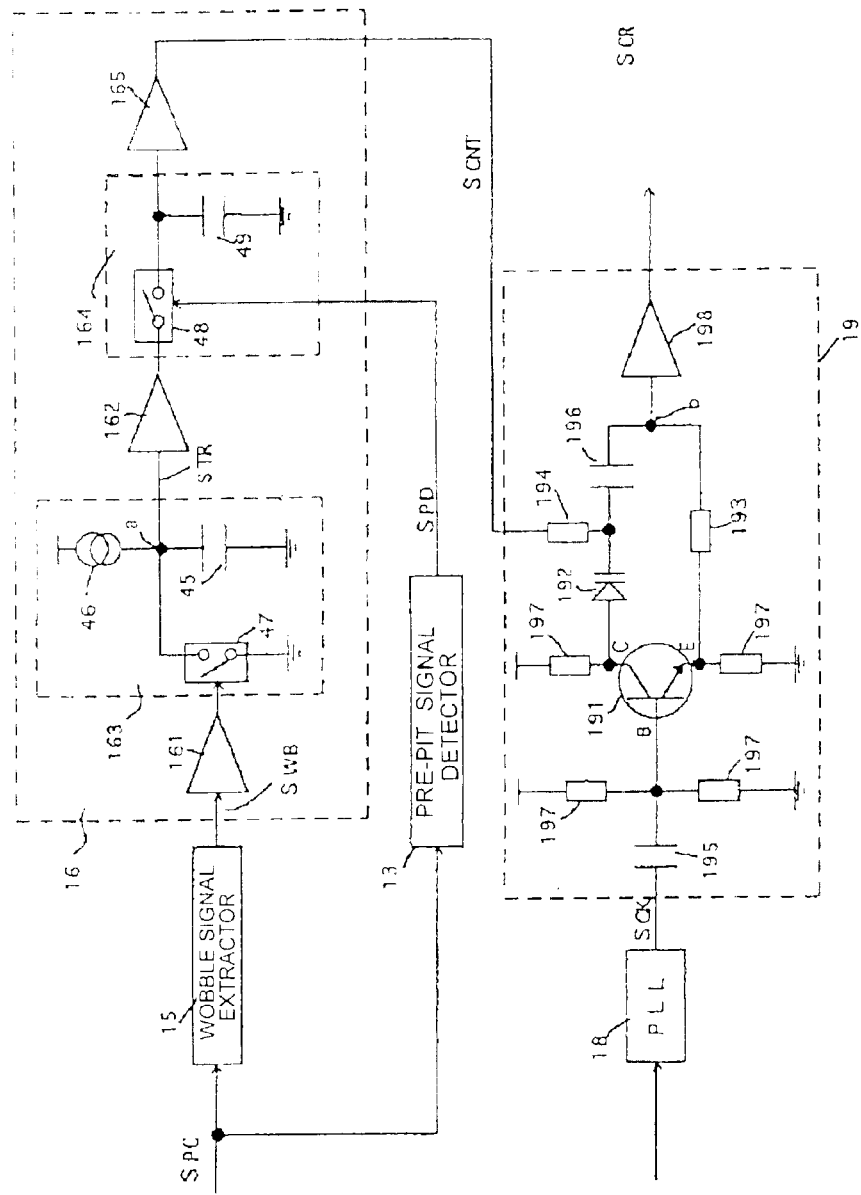
FIG. 6 is a block diagram illustrating constructions of a phase comparator and a PLL circuit illustrated in FIG. 4.

Next, the more detailed constructions and operations of the phase comparator 16 and phase shifter 19 will be explained by referring to FIGS. 6 and 8.

The phase comparator 16 includes a triangular wave generating circuit 163 that generates a triangular wave signal having a prescribed angle of inclination during an H level period of the extracted wobble signal SWB, and a sample-hold circuit 164 that holds the amplitude level of the triangular wave signal at the detection timing of the pre-pit detection signal SPD.

The triangular wave generating circuit 163 includes a capacitor 45 one end of which is grounded, a constant current source 46 that is connected to the other end of the capacitor 45 and supplies a constant current to the capacitor 45, and a switch 47 one end of which is grounded and the other end of which is connected to a point (a) of connection between the capacitor 45 and the constant current source 46. Also, correspondingly to the extracted wobble signal SWB supplied via the buffer 161, the switch 47 is kept open during a time period in which the extracted wobble signal SWB has an H level and is kept closed during a time period in which the extracted wobble signal SWB has an L (Low) level.

By the above-described construction, a triangular wave signal is generated. Namely, when the extracted wobble signal SWB becomes H level and thereby the switch 47 is opened, a constant rate of charging current is supplied from the constant current source 46 to the capacitor 45. Owing to that charging current, the terminal voltage at the point (a) of connection, namely the charged voltage of the capacitor 45, rises at an rate corresponding to the electrostatic capacity of the capacitor 45 (T1 in FIG. 8(*d*)).

Figure 8:
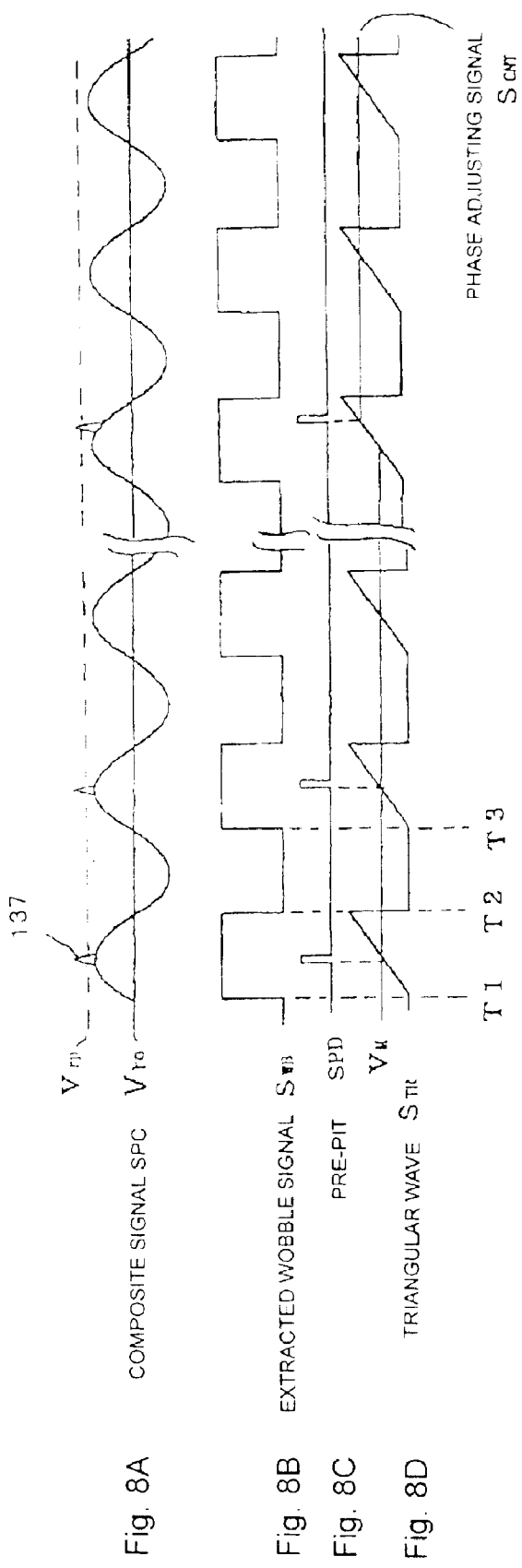
FIGS. 8A, 8B, 8C, and 8D illustrate signal waveforms of the respective portions of FIG. 4.

On the other hand, when the extracted wobble signal becomes L level and the switch 47 is closed, the charged voltage of the capacitor 45 is momentarily discharged via the switch 47, with the result that the point (a) of connection becomes a ground voltage (T2 in FIG. 8(*d*)). During this period of time, the charging current supplied from the constant current source 46 also flows through the switch 47, bypassing the capacitor 45. And, when the switch 47 is opened again, supplying the charging current to the capacitor 45 is started again, with the result that the terminal voltage of the capacitor 45 rises with time from the ground voltage at a prescribed rate (T3 in FIG. 8(*d*)). In this way, the triangular wave generating circuit 163 generates a triangular wave signal whose amplitude level changes at a prescribed rate during a time period in which the extracted wobble signal SWB has H level. The triangular wave generating circuit 163 thereby outputs the triangular wave signal to the sample-hold circuit 164 via the buffer 162.

The sample-hold circuit 164 includes a switch 48 relaying the triangular wave signal supplied via the buffer 162 to a capacitor 49 in correspondence with the pre-pit detection signal SPD, and a capacitor 49 that holds the voltage level of the relayed triangular wave signal.

The switch 48 becomes closed during a time period in which the pre-pit detection signal SPD has an H level and supplies the triangular wave signal to the capacitor 49. And, during a time period in which the pre-pit detection signal SPD has an L level, the switch 48 is opened so as not to supply the triangular wave signal to the capacitor 49.

Accordingly, the capacitor 49 holds the charged current voltage, corresponding to the amplitude level of the triangular wave signal supplied during the H level period of the pre-pit detection signal SPD, until the next H level time period of the pre-pit detection signal SPD arrives. The charged current voltage that capacitor 49 holds is supplied to the phase shifter 19 via the buffer 165 as the phase adjusting signal SCNT.

In the way described above, the phase comparator 16 generates a triangular wave signal having a prescribed angle of inclination by charging and discharging the capacitor 45 correspondingly to the state of transition between the H level and L level of the extracted wobble signal SWB, and samples and holds the amplitude level of the triangular wave signal at the detecting timing of the pre-pit detection signal SPD.

The groove carrying the wobble signal in the DVD-RW 31 and the pre-pits carrying the pre-pit signal in the DVD-RW 31 are recorded with a prescribed relationship established therebetween as illustrated in FIG. 2. Accordingly, if the phase of the extracted wobble signal SWB output from the wobble signal extractor 15 and the phase of the pre-pit detection signal SPD output from the pre-pit signal detector 13 are in the above prescribed relationship, the level of the signal that is sampled and held is always kept at a prescribed voltage level value (for example, that signal has an intermediate amplitude level VM of the triangular wave signal in FIG. 8D).

However, when the wobble signal components leak in from an adjacent groove track due to the effect of cross-talks, owing to the interference with those wobble signal components, the fluctuations occur on the extracted wobble signal SWB obtained from the relevant groove track on the time-axis basis. On the other hand, since the pre-pits are not formed closely to each other in the radial direction of the DVD-RW 31 as described above, there is no effect of the cross-talk from the adjacent land track. Therefore, the pre-pit detection signal SPD detected from the composite signal SPC can be regarded as an accurate timing signal which is not influenced by the on-time-axis fluctuation due to the cross-talk.

Accordingly, by sample-holding the triangular wave signal produced from the extracted wobble signal SWB at the timing of the pre-pit detection signal SPD, it becomes possible to know the amount of shift from the above-described prescribed phase relationship. That is, the phase comparator 16 operates to output a voltage signal (in this example the amplitude level about the intermediate amplitude level VM) corresponding to the difference in phase (i.e., the time-axis error of the extracted wobble signal due to the cross-talks) between the extracted wobble signal SWB and the pre-pit detection signal SPD. The phase difference signal is supplied to the phase shifter 19 as the phase adjusting signal SCNT.

On the other hand, the phase shifter 19 includes a transistor 191 to whose base terminal B via a capacitor 195 the clock signal SCK output from the PLL circuit 18 is supplied, a variable capacitance diode 192 the anode of which is connected to a collector terminal C of the transistor 191 and the cathode of which is connected to a resistor 193 at a point (b) of connection via a capacitor 196, and the resistor 193 one end of which is connected to an emitter terminal E of the transistor 191 and the other end of which is connected to the point (b) of connection.

Also, the phase adjusting signal SCNT supplied from the phase comparator 16 is input to the cathode of the variable capacitance diode 192 via a resistor 194. The recording clock signal SCR is output from the point (b) of connection via a buffer 198. It is noted that a plurality of resistors 197 are bias resistors for the transistor 191.

By the above-described construction, the clock signal SCK supplied from the PLL circuit 18 is input to a phase shifter 19, and the phase of the clock signal SCK is phase-shifted correspondingly to the phase adjusting signal SCNT supplied from the sample-hold circuit 164. Namely, the clock signal SCK supplied to the base terminal B of the transistor 191 is output from the collector terminal C as an inverted signal produced by performing 180-degree phase inversion on the clock signal SCK and is output from the emitter terminal E as the same phase signal as the input clock signal SCK. At this time, if the reactance value based on the electrostatic capacities the variable capacitance diode 192 and the capacitor 196 is sufficiently small compared to the resistance value of the resistor 193, the output signal from, the point (b) of connection, namely the recording clock signal SCR output from the phase shifter 19, is phase shifted substantially 180 degrees with respect to the input clock signal SCK.

Conversely, if the reactance value is sufficiently larger than the resistance value, the input clock signal SCK and the recording clock signal SCR remain to have the same phase. In this way, the phase shift amount changes correspondingly to the impedance of the variable capacitance diode 192, the capacitor 196, and the resistor 193. Incidentally, if an phase shift amount larger than 180 degrees is required, the phase shifter 19 may have a multi-stage construction by connecting plural phase shifters 19 in series.

In this embodiment, the phase difference signal output from the phase comparator 16 is supplied to the variable capacitance diode 192 as the phase adjusting signal SCNT and, by this phase adjusting signal SCNT, the terminal voltage of the variable capacitance diode 192 is changed to thereby change the reactance value of the variable capacitance diode and thereby change the phase shift amount of the clock signal SCK, thereby obtaining the recording clock signal SCR. Namely, in correspondence with to what extent the signal level of the phase shift adjusting signal SCNT is out of phase from the above-described VM signal level representing that the phase relationship between the extracted wobble signal and the pre-pit detection signal is as prescribed, the phase shift amount of the clock signal SCK is adjusted in the direction to cancel that phase shift amount. After adjustment, the clock signal is output to the encoder 6 and to the power control circuit 5 as the recording clock signal SCR.

In this way, since the on-time-axis fluctuation of the clock signal produced according to the wobble signal, the effect of cross-talks upon which is non-ignorable, is corrected using the pre-pits not affected by cross-talks at all, it becomes possible to produce a recording clock signal synchronized with a high accuracy with the rotation of the disc.

Figure 7:
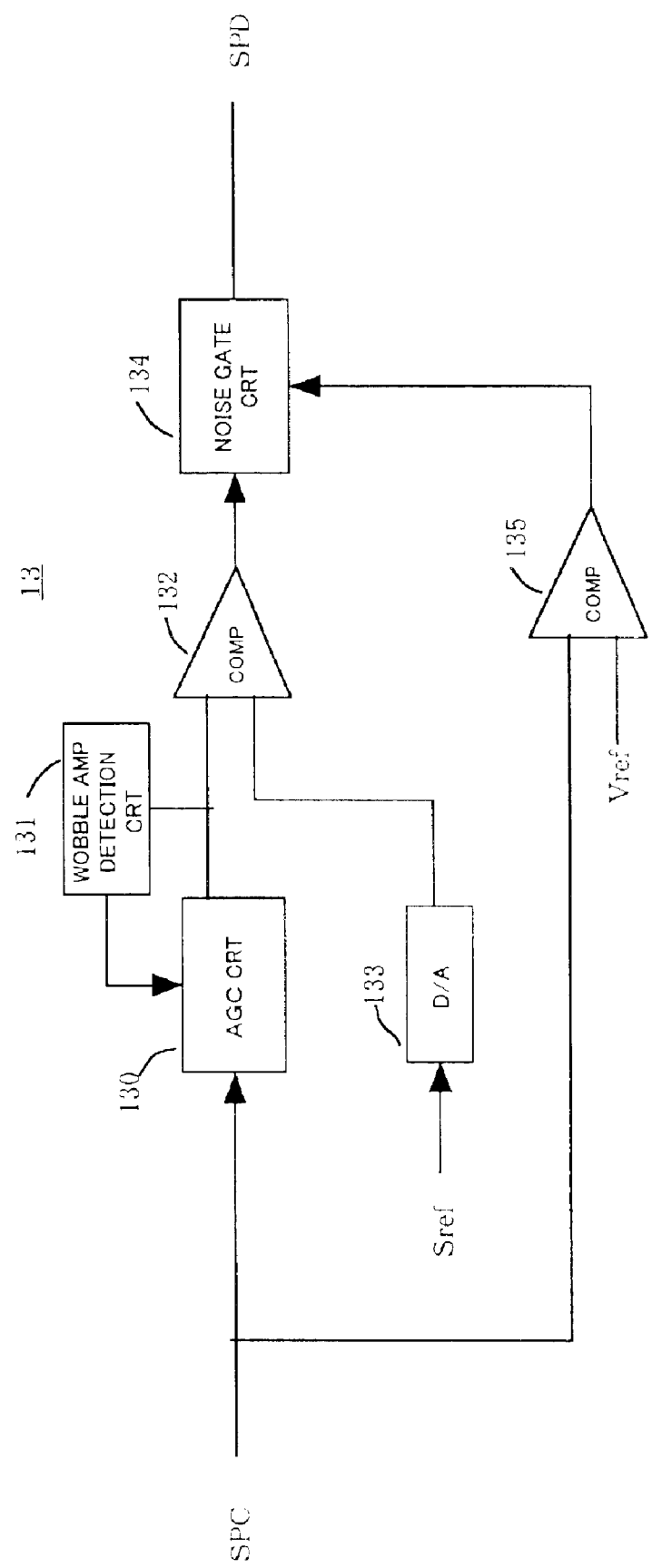
FIG. 7 is a block diagram illustrating a construction of a pre-pit signal detector illustrated in FIG. 4.

Next, the pre-pit signal detector 13 will be explained in detail. FIG. 7 is a block diagram illustrating a basic (construction example of the pre-pit signal detector 13. In FIG. 7, the pre-pit signal detector 13 includes an AGC circuit 130, a wobble amplitude detecting circuit 131, a comparator 132, a D/A (Digital to Analog) converter 133, a noise gate circuit 134, and a comparator 135.

The composite signal SPC of the wobble signal and pre-pit signal that has been input from the BPF 12 is input to the comparator 132 via the AGC circuit 130, and the output signal of the AGC circuit is input to the wobble amplitude detecting circuit 131. The AGC circuit 130 and the wobble amplitude detecting circuit 131 construct an AGC loop. By the wobble amplitude detecting circuit 131 detecting the amplitude of the composite signal SPC and supplying this signal to the AGC circuit 130, the composite signal SPC is (AGC-controlled so that the gain of the composite signal SPC is equal to the prescribed value. The composite signal SPC, the gain of which has been adjusted by the AGC loop, is input to the comparator 132.

On the other hand, a pre-pit detection reference signal Sref output from the CPU 10 is input to the D/A converter 133. The pre-pit detection reference signal Sref is digital data representing the reference level for detecting the pre-pit portions 137 in the composite signal SPC Illustrated in FIG. 8A, i.e. representing the previously stated pre-pit detection reference level Vrp. The D/A converter 133 produces a pre-pit detection reference level Vrp by performing D/A conversion of the pre-pit detection reference signal Sref from the CPU 10 and supplies it to the comparator 132.

The comparator 132 compares the AGC-controlled composite signal SPC and the pre-pit detection reference level Vrp with each other, and inputs the comparison result signal to the noise gate circuit 134. Accordingly, the pre-pit portions 137 in the composite signal SPC Is detected by the comparator 132, whereby the comparison result signal including pulses (such as the waveform of FIG. 8C) corresponding to the positions of the pre-pit portions 137 is input to the noise gate circuit 134. However, even when the level of the input signal to the comparator 132 exceeds the pre-pit detection reference level Vrp due to the noise components, other than the pre-pit portions, the comparator 132 also outputs the pulses to the noise gate circuit 134 inconveniently. The pulses produced based on those noises are eliminated by the noise gate 134 that will be described below.

The composite signal SPC from the BPF 12 is also input to the comparator 135. The comparator 135 is a circuit that detects a time period in which a pre-pit signal exists in the wobble signal. As illustrated in FIG. 8A, the pre-pit portion 137 is normally located in the vicinity of a maximum amplitude position of the wobble signal. Therefore, the change of the amplitude, which the comparator 132 detects at the positions of the wobble signal other than the positions corresponding to the pre-pits, can be regarded as the change due to, not the pre-pit, but the noise. Therefore, by comparing the composite signal SPC with a prescribed reference voltage Vref, the comparator 135 generates a gate signal indicating an area near the maximum amplitude position of the wobble signal. The noise gate circuit 134 gates the output signal of the comparator 132 by the gate signal output from the comparator 135. As a result of this, the amplitude changes due to the noise are eliminated from the amplitude changes that the comparator 132 detected, whereby a correct pre-pit detection signal SPD is obtained. The pre-pit detection signal SPD thus obtained is input to the pre-pit signal decoder 14 illustrated in FIG. 4.

It is noted that, regarding the structure of the pre-pit signal detecting circuit 13 illustrated in FIG. 7, for convenience of the explanation, the components common to both a structure for recording and a structure for reproduction has been illustrated. However, actually, as disclosed in, for example, Japanese Patent Application Laid-Open No. 2000-311344, the pre-pit signal detecting circuit 13 is constructed in such a manner that a pre-pit detecting circuit for the mark period and a pre-pit detecting circuit for the space period are independent of each other.

The present invention is characteristic in detecting, especially in the above-described unreadable emboss area 518 (see. FIG. 3), pre-pits with changing the pre-pit detection reference level Vrp supplied to the comparator 132 from the CPU 10 via the D/A converter 133.

As described above, the unreadable emboss area 518 is provided for detecting the pre-pits and establishing correct recording clock signals as a preparation stage for writing control data, etc. into the extra border zone 519 following the unreadable emboss area 518. The pre-pits are formed in the unreadable emboss area 518, and those pre-pits are detected by the pre-pit detecting circuit 13 illustrated in FIG. 7. However, since the groove track 32 is intermittently formed within the unreadable emboss area 518, it is likely that the composite signal SPC including the wobble signal and the pre-pit signal has a lot of noise components. Namely, within the emboss area, at the positions where the groove track 32 is broken off, the reflected light from the disc diverges and is not correctly returned to the pick-up 1, and therefore the wobble signal corresponding thereto contains a relatively high level of noises at those positions. For this reason, in the unreadable emboss area 516, at the time of manufacturing the disc, the groove track 32 is formed beforehand so that the amplitude of the wobble signal becomes large in level, thereby increasing the C/N ratio of the wobble signal. On the other hand, in the pre-pit detecting circuit 13, the AGC loop controls the gain of the wobble signal. Thus, the gain of the wobble signal is decreased down to a normal value, and the level of the pre-pit signal is also decreased down. Therefore, within the unreadable emboss area 518, the effect of the noise on the pre-pit signal is large. In this view, if the fixed pre-pit detection reference level Vrp, normally used for the detection in the normal data area, is used, the correct detection of the pre-pits cannot be performed.

For this reason, in the present invention, in a case where the pre-pits cannot be detected with the normal pre-pit detection reference level Vrp, the pre-pit detection reference level Vrp is changed by changing the pre-pit detection reference signal Sref output from the CPU 10, and the detection of the pre-pits is repeatedly performed.

Normally, the pre-pit detection reference level Vrp is determined to be approximately 40% to approximately 50% of the amplitude of the wobble signal. Namely, a value that is approximately 40% of a general or theoretical wobble signal amplitude value is determined beforehand at the time of designing and the CPU 10 outputs digital data representing that value to the pre-pit detecting circuit 13 as the pre-pit detection reference signal Sref. Namely, initially, an initial value the pre-pit detection reference level Vrp is set to be approximately 40% to approximately 50% of the general and theoretical amplitude of the wobble signal, and the CPU 10 outputs the digital data indicating this value to the pre-pit detecting circuit 13 as the pre-pit detecting circuit 13. Therefore, first the pre-pit detection is performed by using this initial value, and if the pre-pit detection fails, the pre-pit detection is performed again with changing the pre-pit detection reference level by several steps. Here, one step may be 2 to 3% of the wobble signal amplitude. By doing so, even in the unreadable emboss area 518, correct pre-pit detection can be performed by eliminating the effect of the noises.

Figure 9:
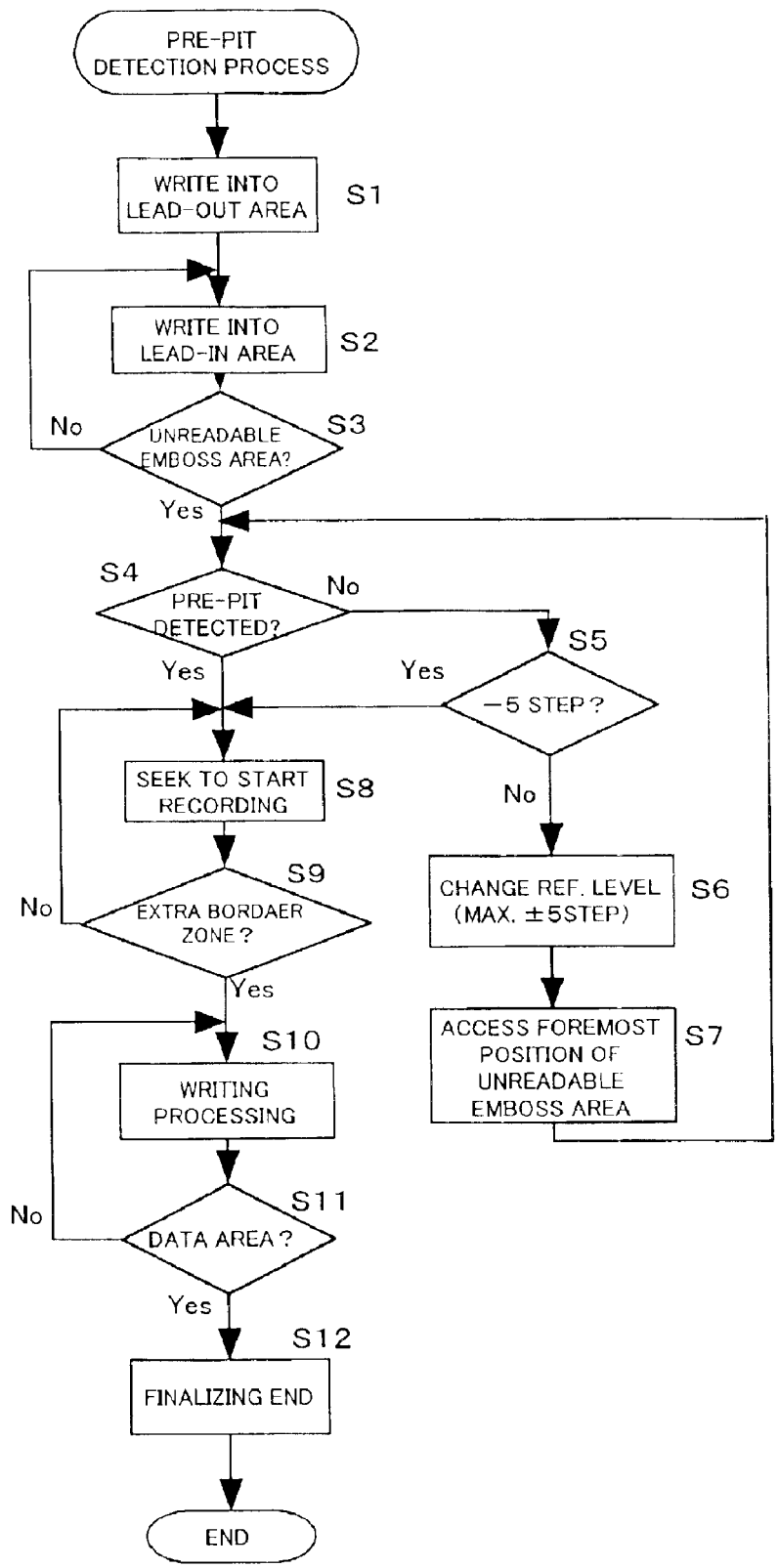
FIG. 9 is a flowchart illustrating a pre-pit detecting process.

The pre-pit detection process that includes the above-described processing will be explained with reference to a flowchart of FIG. 9. During the recording of desired information onto the DVD-RW 31 by the information recording/reproducing apparatus S illustrated in FIG. 4, when the user instructs a finalizing processing to the information recording/reproducing apparatus S, the process illustrated in FIG. 9 is executed. It is noted that, the process illustrated in FIG. 9 is basically executed by the CPU 10 which executes a program prepared in advance. Also, in the example of FIG. 9, if the pre-pit detection process cannot correctly be performed within the unreadable emboss area 518 by using the initial value of the pre-pit detection reference level Vrp, the pre-pit detection process is repeatedly performed with changing the pre-pit detection reference level Vrp up to ±5 steps at maximum, i.e., "+1 step", "−1 step", "+2 step", "−2 step", - - - . It is to be noted that the 1 step is a value that is predetermined based upon the wobble signal amplitude or the like as described above.

When the finalizing processing is instructed by the user, first, prescribed information is written into the lead-out area (step S1). Next, writing the control information, etc. in the lead-in area is started (step S2) and then necessary information is sequentially written into appropriate zones from an initial zone 511 of the lead-in area toward the lower zone in FIG. 38. This writing is performed by sequentially moving the light team B emitted by the pick-up 1, from the initial zone 511 to other zones.

When the light beam B reaches the end of the buffer zone 515 while it is writing necessary information in the above-described way, the light beam B further advances to the readable emboss area 517. However, since necessary information is already recorded within the readable emboss area 517 at the time of shipment of the DVD-RW 31 as stated previously, new recording is not performed, and the light beam B advances to the unreadable emboss area 518. It is noted that, although no pre-pit is formed within the readable emboss area 517, the control of the pick-up 1 is performed according to the address information contained in the control information, or else that has already been recorded.

When the light beam B enters the unreadable emboss area 518 (step S3: Yes), it is determined whether the pre-pit detection is correctly performed (step S4). In a case where the pre-pit detection is correctly performed (step S4: Yes), the process proceeds to step S8.

On the other hand, in a case where the pre-pit detection is not correctly performed within the unreadable emboss area 518 (step S4: No), the CPU 10 determines whether the pre-pit detection reference level Vrp has been changed up to "−5 step" (step S5).

In a case where the pre-pit detection reference level Vrp is not already changed up to "−5 step", the CPU 10 changes the pre-pit detection reference level Vrp by one step in the above-described sequential order of change (for example, when the pre-pit detection reference level Vrp is now "+1 step", that level is changed to "−1 step") (step S6), and returns the light beam B to the head of the unreadable emboss area 518 to perform pre-pit detection again.

In this way, within the unreadable emboss area 518, the pre-pit detection is retried with changing the pre-pit detection reference level Vrp up to "−5 step", in the order of "+1 step", "−1 step", "+2 step", "−2 step", "+3 step", - - - until the pre-pit detection is correctly performed.

In a case where the pre-pit detection is correctly performed with changing the pre-pit detection level Vrp (step S4: Yes), the process proceeds to step S8. Also, in a case where the pre-pit detection is not correctly performed even if the pre-pit detection reference level Vrp is changed up to "−5 step" (step S5: Yes), the process proceeds to step S8 as irregular processing.

It is noted that, the pre-pit detection is not correctly performed within the unreadable emboss area 518 in step S4, basically when the pre-pit detection signal SPD from the pre-pit detecting circuit 13 illustrated in FIG. 7 does not include the pulses such as that illustrated in FIG. 8C indicating the existence of pre-pits, or when pulses having a width clearly larger than the pulse width corresponding to the pre-pit width satisfying the standard requirements, or a larger number of pulses than the number of the pulses corresponding to those pre-pits (that is, the situation where noises with larger amplitude is detected), or the like.

Next, the pick-up 1 seeks for a position that is slightly before the extra border zone 519, and then it is determined whether or not the light beam B has advanced to the extra border zone 519 after (see FIG. 2B) the unreadable emboss area 518 (step S9). Until the light beam B advances to the extra border zone 519, in principle (namely, except for a case where step S5 results in Yes and the irregular processing is executed), a recording clock signal is produced according to the pre-pits detected within the unreadable emboss area 518. Therefore, at the moment when the light beam B enters the extra border zone 519, a correct recording clock signal is produced.

Then, necessary control information and the like are written in the extra border zone 519 (step S10) and, subsequently, it is determined whether or not the light beam B has entered the data area following the zone 519 (step S11).

When it is detected that the light beam B has entered the data area (step S11: Yes), it means that writing control information into the lead-in area is finished, and therefore the finalizing processing ends (step S12).

It is noted that, in the example of FIG. 9, even if the pre-pit detection still cannot be correctly performed (step S5: Yes) after changing the pre-pit detection reference level Vrp up to "−5 step", the light beam B is moved to advance toward the extra border zone 519 via the unreadable emboss area 518. In such a case, the recording clock signal is produced only based on the wobble signal obtained within the unreadable emboss area 518, and the pick-up 1 is controlled based on the recording clock signal to advance the light beam B. Alternatively, if the pre-pit detection cannot be correctly performed (step S5: Yes), the process may be ended with displaying an error message.

In the above-described way, according to the present invention, the pre-pit detection is repeatedly performed with changing the pre-pit detection reference level within a prescribed range in the unreadable emboss area 518 in which the groove track 32 is formed in the form of embosses or intermittently. Therefore, even if a large amount of noise is contained in the wobble signal, correct detection of the pre-pits becomes possible. In connection with this, even in other areas of the optical disc, than the unreadable emboss area, where the effect of the noise is large, it is possible to change the pre-pit detection reference level and to retry the pre-pit detection.

In the above-described example, the pre-pit detection reference level is changed within the range of 5 steps, with 1 step corresponding to 2 to 3% of the wobble signal amplitude. However, that is simply one example. Namely, in the present invention, of course the pre-pit detection reference level may be changed with a width and/or range of change that is different from that range of change described in the above example. In addition, actually, during a time period in which the pre-pit detection reference level is being changed and pre-pit detection is being repeatedly performed, the user may feel as if the finalizing processing are being interrupted. Therefore, it is preferable to determine the range of change and/or the frequency of changes of the pre-pit detection reference level by taking into account the waiting period of time or the like that a general level of user can permit.

Also, in the example of FIG. 9, each time the pre-pit detection reference level is changed, the light beam is moved to the foremost or head position of the unreadable emboss area 519, and then pre-pit detection is performed again. Alternatively, if the pre-pit detection does not succeed at the point in time when the light beam has advanced a prescribed distance, the pre-pit detection reference level maybe changed at that time without returning the light bean to the foremost position of the unreadable emboss area 519. For example, if the pre-pit detection does not succeed, the pre-pit detection maybe performed with changing the pre-pit detection reference level every unit of several ECC blocks.

In steps S7 of FIG. 9, it is described that the light beam B is moved to the head of the unreadable emboss area 519 after changing the pre-pit detection reference level. However, strictly, the position of the readable emboss area 517 slightly preceding the unreadable emboss area 518 is searched and the light beam B is moved to the position, and then the light beam B is moved to the unreadable emboss area 518 from that position. This is because, strictly the pre-pits within the unreadable emboss area 518 cannot be read, and hence searching and moving of the light beam B to the unreadable emboss area 518 cannot be performed.

In the above-described embodiment, as the recording medium, the DVD-RW having pre-pits formed between the wobbled groove track (i.e., the land track) is used. However, it is also possible to apply the present invention to a recording medium in which pre-pits are formed on the groove track that is a track for recording data.

While FIG. 1 shows a type of disc (DVD-RW 31) in which the pre-pit 34 is formed to bridge over two adjacent groove tracks 32, the present invention can also be applied to the disc in which pre-pits of other shape are formed. Namely, such a disc includes a disc of the type having pre-pits of the above-described configuration called "the ladder type", the disc of the type having independent pre-pits between adjacent groove tracks, a disc of the type having formed therein pre-pits by partially curving the groove track itself, and so forth. The present invention is, namely, applicable to any type of discs regardless of the shape or form of the pre-pit.

As has been explained above, according to the present invention, especially within the unreadable emboss area of the lead-in area, etc., the pre-pit detection is repeatedly performed with changing the pre-pit detection reference level. Therefore, even in the area including large noise for the reason that the track is formed in the shape of embosses or the like, it is possible to perform correct detection of the pre-pits.

The invention ray be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2001-223556 filed on Jul. 24, 2001 including the specification, claims, drawings and summary is incorporated herein by reference in its entirety.

What is claimed is:

1. An information recording/reproducing apparatus which irradiates a light beam on an optical disc on which pre-pits are formed, and performs recording of information with respect to the optical disc according to a recording clock produced based on a wobble signal and a pre-pit signal, comprising:

a push-pull signal producing unit which produces a push-pull signal based on a reflected light from the optical disc;

a pre-pit detecting circuit which detects the pre-pits by comparing the push-pull signal and a reference level; and a control unit which executes retry process of changing the reference level and again executing the detection of the pre-pits by the pre-pit detecting circuit, when the pre-pit is not detected.

2. An information recording/reproducing apparatus according to claim 1, wherein the control unit executes the retry process only in emboss areas of the disc in which information recording tracks are intermittently formed.

3. An information recording/reproducing apparatus according to claim 2, wherein the emboss areas comprise an unreadable emboss area of the optical disc.

4. An information recording/reproducing apparatus according to claim 1, wherein the control unit executes the retry process from a foremost portion of the emboss area when the pre-pit is not detected.

5. An information recording/reproducing apparatus according to claim 1, wherein the control unit executes the retry process for every unit including a prescribed number of blocks within the emboss area when the pre-pit is not detected.

6. An information recording/reproducing apparatus according to claim 1, wherein the control unit repeatedly executes the retry process with increasing or decreasing the reference level by a prescribed change amount.

7. An information recording/reproducing apparatus according to claim 6, wherein the prescribed change amount is determined to be a value which has a prescribed proportion to the amplitude of the wobble signal.

8. An information recording/reproducing apparatus according to claim 1, wherein the control unit executes an irregular process of writing data into an area immediately succeeding the unreadable emboss area according to the recording clock produced from only the wobble signal, when the pre-pit detecting circuit cannot detect the pre-pit after executing the retry process.

9. An information recording/reproducing apparatus according to claim 8, wherein the control unit executes the irregular process, when the pre-pit detecting circuit cannot detect the pre-pit after executing the retry process for a prescribed number of times or after executing the retry process with changing the reference level within a prescribed range.

10. A pre-pit detecting method performed by an information recording/reproducing apparatus which irradiates a light beam on an optical disc on which pre-pits are formed, and performs recording of information with respect to the optical disc according to a recording clock produced based on a wobble signal and a pre-pit signal, the method comprising the steps of:

producing a push-pull signal based on a reflected light from the optical disc;

detecting the pre-pits by comparing the push-pull signal and a reference level; and executing retry process of changing the reference level and again executing the detection of the pre-pits, when the pre-pit is not detected.

11. A pre-pit detecting method according to claim 10, wherein the step of executing the retry process repeatedly executes the retry process with increasing or decreasing the reference level by a prescribed change amount.

12. A pre-pit detecting method according to claim 11, further comprising a step of executing an irregular process of writing data into an area immediately succeeding the unreadable emboss area according to the recording clock produced from only the wobble signal, when the pre-pit is not detected after executing the retry process.

* * * * *